(12) United States Patent
Lim et al.

(10) Patent No.: US 7,961,678 B2
(45) Date of Patent: Jun. 14, 2011

(54) APPARATUS AND METHOD FOR TRANSMITTING AND RECEIVING CONNECTION IDENTIFIER INFORMATION IN A COMMUNICATION SYSTEM

(75) Inventors: Geun-Hwi Lim, Seongnam-si (KR); Won-Il Roh, Yongin-si (KR); Jae-Jeong Shim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 12/186,756

(22) Filed: Aug. 6, 2008

(65) Prior Publication Data

US 2009/0042567 A1 Feb. 12, 2009

(30) Foreign Application Priority Data

Aug. 6, 2007 (KR) .................. 10-2007-0078798

(51) Int. Cl.
*H04W 4/00* (2009.01)
*H04W 36/00* (2009.01)
(52) U.S. Cl. .................. 370/329; 370/338; 455/436
(58) Field of Classification Search .................. None
See application file for complete search history.

(56) References Cited

U.S. PATENT DOCUMENTS

| 2008/0056193 | A1* | 3/2008 | Bourlas et al. | 370/331 |
| 2008/0056219 | A1* | 3/2008 | Venkatachalam | 370/342 |
| 2008/0268844 | A1* | 10/2008 | Ma et al. | 455/436 |

FOREIGN PATENT DOCUMENTS

WO 2006/020636 A2 2/2006

OTHER PUBLICATIONS

Sik Choi et al., Fast Handover Scheme for Real-Time Downlink Services in IEEE 802.16e BWA System, Vehicular Technology Conference, May 30-Jun. 2005, 1VTC 2005-Spring, 2005 IEEE 61st, vol. 3, pp. 2028-2032.

* cited by examiner

*Primary Examiner* — Nittaya Juntima
(74) *Attorney, Agent, or Firm* — Jefferson IP Law, LLP

(57) ABSTRACT

A method for transmitting Connection Identifier (CID) information by a Base Station (BS) in a communication system is provided. The method includes transmitting a first message including information indicating a Transparent Connection Identifier (TCID) range expressed by a start value and an end value of TCIDs available in the BS, and information indicating a first transparent zone in which the BS is located, assigning one of TCIDs in the TCID range to a Mobile Station(MS) when a second message including a connection setup request from the MS is received and transmitting a third message including the assigned TCID to the MS, wherein the first transparent zone is one of a plurality of transparent zones supportable by the communication system, at least one BS is located in each transparent zone, and TCIDs in the TCID range are shared by the at least one BS included in the first transparent zone.

20 Claims, 3 Drawing Sheets

APPARATUS AND METHOD FOR TRANSMITTING AND RECEIVING CONNECTION IDENTIFIER INFORMATION IN A COMMUNICATION SYSTEM

PRIORITY

This application claims the benefit under 35 U.S.C. §119(a) of a Korean patent application filed in the Korean Intellectual Property Office on Aug. 6, 2007 and assigned Serial No. 2007-78798, the entire disclosure of which is hereby incorporated by reference.

BACKGROUND OF THE INVENTION

1. Field of the Invention

The present invention relates to a communication system. More particularly, the present invention relates to an apparatus and method for transmitting and receiving Connection Identifier (CID) information in a communication system.

2. Description of the Related Art

In a wireless communication system, a Mobile Station (MS) establishes a connection to a Base Station (BS) in order to communicate with the BS. The MS can establish multiple connections to the BS and is assigned multiple CIDs from the BS to respectively identify each of the multiple connections. The MS, when initially accessing a network of the communication system, is assigned a Basic CID and a Primary Management CID from the BS to transmit and receive control data or a control signal, to/from the BS. Further, the MS is assigned one or more Transport CID(s) for transmission/reception of user data.

Generally, the CID assigned from the BS to the MS has a unique value in the BS. Accordingly, if the MS moves from a service area of the BS to a service area of another BS, the MS should be assigned a new CID from the new BS. With reference to FIG. 1, a description will now be made of a transmission/reception operation for assigning Basic CID and Primary Management CID between a BS and an MS during handover of the MS.

FIG. 1 is a signaling diagram illustrating a method for transmitting and receiving CIDs in a conventional communication system.

Referring to FIG. 1, the communication system includes an MS 110, a first BS (BS1) 120, and a second BS (BS2) 130. In FIG. 1, the BS1 120 is assumed to be a serving BS which is providing a communication service to the MS 110, and the BS2 130 is assumed to be a target BS to which the MS 110 will handover.

The BS1 120 sends a Downlink Channel Descriptor (DCD) message to the MS 110 in step 111. More specifically, the DCD message is broadcast by the BS1 120 and received by the MS 110.

Upon receipt of the DCD message, the MS 110 sends a Ranging-Request (RNG-REQ) message to the BS1 120 in step 113. The RNG-REQ message includes basic information for establishing a call connection.

The BS1 120 sends a Ranging Response (RNG-RSP) message to the MS 110 in response to the RNG-REQ message in step 115. The RNG-RSP message includes a Basic CID assigned to the MS 110. It will be assumed in FIG. 1 that a Basic CID assigned to the MS 110 is, for example, '10'.

The MS 110 sends a Subscriber Station Basic Capability Request (SBC-REQ) message to the BS1 120 for basic capability negotiation for the MS 110 in step 117. The SBC-REQ message includes information on, for example, a modulation scheme and/or a coding scheme that the MS 110 can use.

Upon receipt of the SBC-REQ message from the MS 110, the BS1 120 sends a Subscriber Station Basic Capability Response (SBC-RSP) message to the MS 110 in response to the SBC-REQ message in step 119.

The MS 110 sends a Registration Request (REG-REQ) message to the BS1 120 in step 121. Upon receipt of the REG-REQ message, the BS1 120 registers the MS 110 using registration information of the MS 110, included in the REG-REQ message.

The BS1 120 sends a Registration Response (REG-RSP) message to the MS 110 in response to the REG-REQ message in step 123. The REG-RSP message includes registration information of the registered MS 110 and a Primary Management CID assigned to the MS 110. It will be assumed in FIG. 1 that a Primary Management CID assigned to the MS 110 is, for example, '110'.

Being assigned the Basic CID and Primary Management CID, the MS 110 sets up a connection to the BS1 120 using the Basic CID and Primary Management CID in step 125. The MS 110 can additionally be assigned a Transport CID(s) from the BS1 120, and can exchange user data with the BS1 120 using the Transport CID.

Upon detecting a need to handover, the MS 110 sends a Handover Request (HO-REQ) message to the BS1 120 in step 127.

Upon receipt of the HO-REQ message, the BS1 120 sends a Handover Response (HO-RSP) message to the MS 110 in response to the HO-REQ message in step 129. The HO-RSP message includes therein information on a target BS (e.g., BS2 130) to which the MS 110 will handover.

Upon receipt of the HO-RSP message, the MS 110 determines whether to handover to the BS2 130 using the information included in the HO-RSP message. The MS 110, when it determines to make a handover to the BS2 130, sends to the BS1 120 a Handover Indication (HO-IND) message indicating that it will soon handover to the BS2 130 in step 131.

After sending the HO-IND message to the BS1 120, the MS 110 sends a RNG-REQ message to the handover target BS, i.e., BS2 130 in step 133.

The BS2 130 sends a RNG-RSP message to the MS 110 in response to the RNG-REQ message in step 135. The RNG-RSP message includes Basic CID and Primary Management CID for CID update for the MS 110. It is assumed in FIG. 1 that a Basic CID assigned to the MS 110 is '30', and a Primary Management CID assigned to the MS 110 is '130'.

Upon receiving the RNG-RSP message transmitted from the BS2 130, the MS 110 performs CID update using the CIDs included in the RNG-RSP message. The 'CID update' as used herein refers to an operation of replacing the Basic CID and Primary Management CID already assigned to the MS 110, with newly received Basic CID and Primary Management CID.

After performing the CID update, the MS 110 receives control data or control signals, transmitted from the BS2 130, and later on, the MS 110 is assigned a Transport CID from the BS2 130 and transmits user data to the BS2 130 using the Transport CID.

The CID, for example, the Basic CID, is a CID assigned from the BS for identification of each MS, and is uniquely assigned for each MS by each BS in whose service coverage area the MS is located.

As described above, since the CID is uniquely assigned to one MS by each BS, the MS must be reassigned a new CID when performing handover. Such reassignment requires resources of each BS. In addition, the procedure by which the MS is reassigned the new CID may suffer a time delay caused by the CID assignment thus potentially causing a degradation in service to the MS.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting and receiving CID information in a communication system.

Another aspect of the present invention is to provide a CID information transmission/reception apparatus and method for preventing occurrence of a time delay required for Basic CID assignment during handover in a communication system.

According to one aspect of the present invention, a method for transmitting Connection Identifier (CID) information by a Base Station (BS) in a communication system is provided. The method includes transmitting a first message including information indicating a Transparent Connection Identifier (TCID) range expressed by a start value and an end value of TCIDs available in the BS, and information indicating a first transparent zone in which the BS is located, assigning one of TCIDs in the TCID range to a Mobile Station (MS) when a second message including a connection setup request from the MS is received, and transmitting a third message including the assigned TCID to the MS, wherein the first transparent zone is one of a plurality of transparent zones supportable by the communication system, at least one BS is located in each transparent zone, and TCIDs in the TCID range are shared by the at least one BS located in the first transparent zone.

According to another aspect of the present invention, a method for receiving Connection Identifier (CID) information by a Mobile Station (MS) in a communication system is provided. The method includes receiving from a Base Station (BS) a first message including information indicating a first Transparent Connection Identifier (TCID) range expressed by a start value and an end value of TCIDs available in the BS, and information indicating a first transparent zone in which the BS is located, transmitting a second message including a connection setup request to the BS and after transmitting the second message to the BS, receiving a third message including one of TCIDs in the first TCID range, which is assigned to the MS from the BS, wherein the first transparent zone is one of a plurality of transparent zones supportable by the communication system, at least one BS is located in each transparent zone, and TCIDs in the first TCID range are shared by the at least one BS located in the first transparent zone.

According to further another aspect of the present invention, an apparatus for transmitting Connection Identifier (CID) information in a communication system is provided. The apparatus includes a Base Station (BS) for transmitting a first message including information indicating a Transparent Connection Identifier (TCID) range expressed by a start value and an end value of TCIDs available by the BS itself, and information indicating a first transparent zone in which the BS is located, for assigning one of TCIDs in the TCID range to a Mobile Station (MS) when a second message including a connection setup request from the MS is received, and for transmitting a third message including the assigned TCID to the MS, wherein the first transparent zone is one of a plurality of transparent zones supportable by the communication system, at least one BS is located in each transparent zone includes n BSs, m and n are integers greater than or equal to 1, and TCIDs in the TCID range are shared by the at least one BS located in the first transparent zone.

According to yet another aspect of the present invention, an apparatus for receiving Connection Identifier (CID) information in a communication system is provided. The apparatus includes a Mobile Station (MS) for receiving from a Base Station (BS) a first message including information indicating a first Transparent Connection Identifier (TCID) range expressed by a start value and an end value of TCIDs available in the BS, and information indicating a first transparent zone in which the BS is located, for transmitting a second message including a connection setup request to the BS and for, after transmitting the second message to the BS, receiving a third message including one of TCIDs in the first TCID range, which is assigned from the BS, wherein the first transparent zone is one of a plurality of transparent zones supportable by the communication system, at least one BS is located in each transparent zone, and TCIDs in the first TCID range are shared by the at least one BS located in the first transparent zone.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for transmitting and receiving Connection Identifiers (CIDs) in a communication system. More specifically, according to an exemplary embodiment of the present invention, by sharing CIDs used for identification of Mobile Stations (MSs) between Base Stations (BSs) in a zone, an MS, when moving in the zone, can communicate with any of the BSs in the zone using its previously assigned CID without a separate CID assignment procedure. Moreover, an exemplary CID transmission/reception apparatus and method proposed by the present invention can be applied to any communication system that performs MS identification using CIDs. In the following examples, the CIDs proposed by the present invention will be called Transparent CIDs (TCIDs). However, this label is for convenience and ease of description only.

Figure 1:
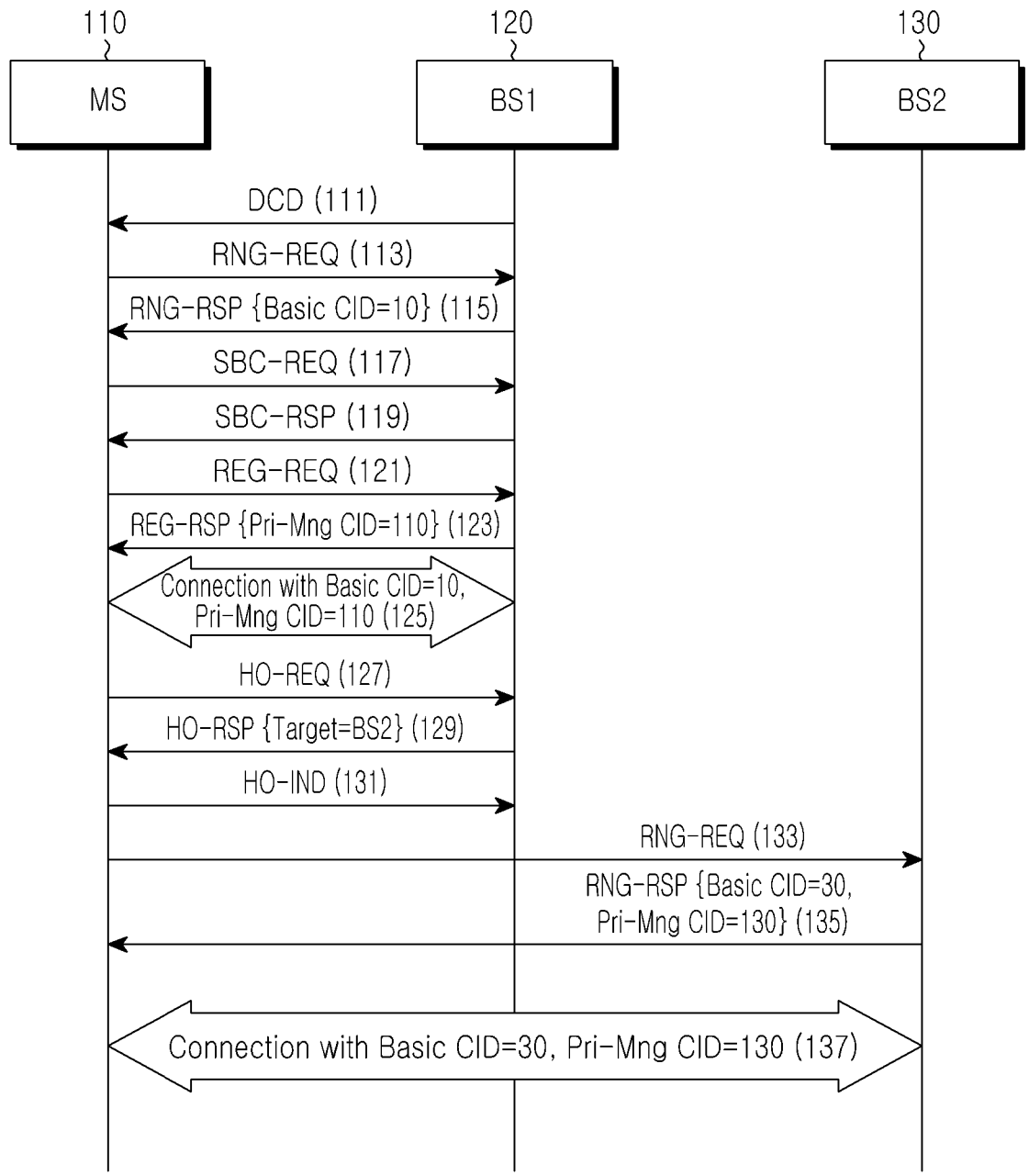
FIG. 1 is a signaling diagram illustrating a method for transmitting and receiving CIDs in a conventional communication system.
Figure 2:
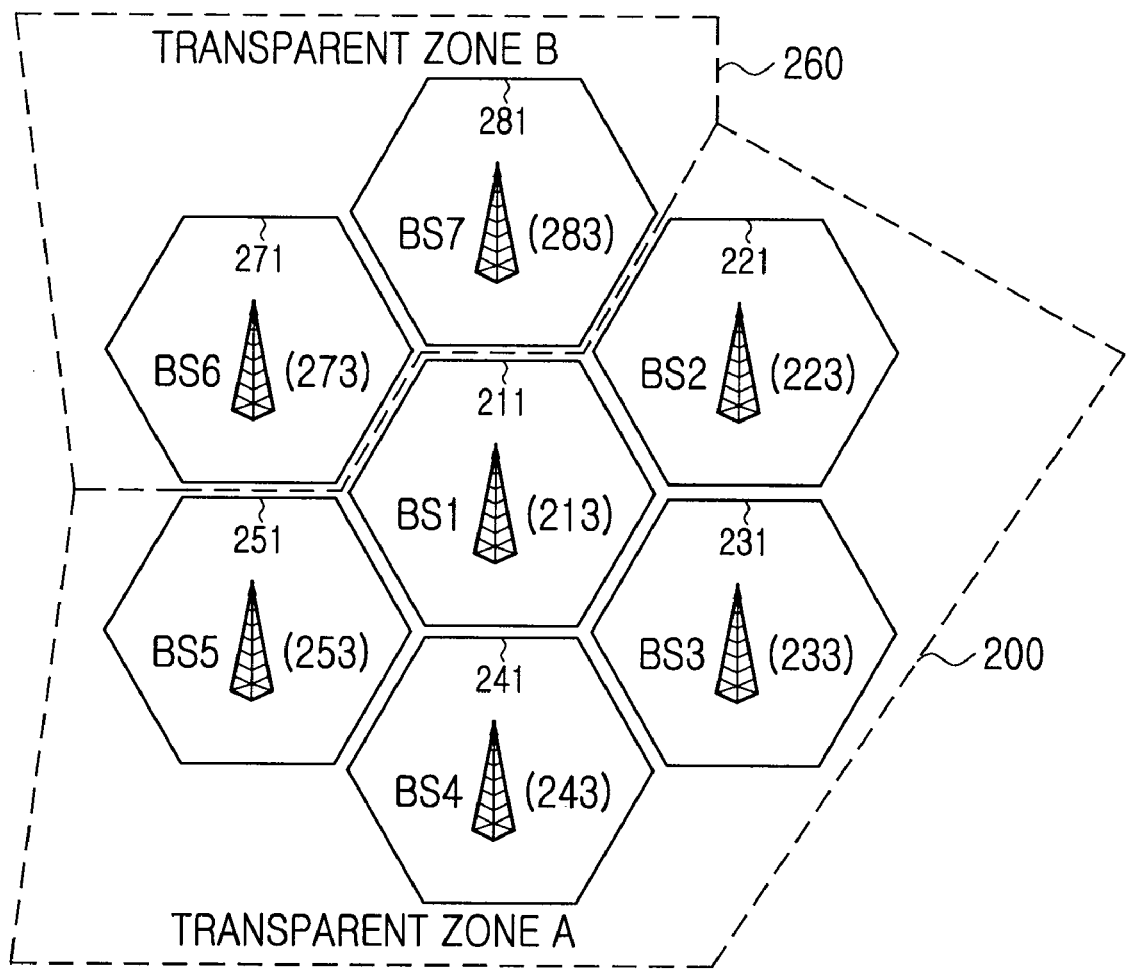
FIG. 2 is a diagram illustrating a configuration of a communication system according to an exemplary embodiment of the present invention.

With reference to FIG. 2, a description will now be made of a configuration of a communication system according to an exemplary embodiment of the present invention.

Referring to FIG. 2, the communication system includes multiple cells. Specifically, the communication system includes cell #1 211 through cell #7 281. Furthermore, a BS is associated with each cell in order to provide service to that cell. That is, BS1 213 provides a service for the cell #1 211, BS2 223 provides a service for the cell #2 221, BS3 233 provides a service for the cell #3 231, BS4 243 provides a service for the cell #4 241, BS5 253 provides a service for the cell #5 251, BS6 273 provides a service for the cell #6 271 and BS7 283 provides a service for the cell #7 281. Although it is illustrated in FIG. 2 that one BS provides a service only for one cell, one BS can also provide a service for multiple cells.

The communication system also includes at least one transparent zone, wherein the at least one transparent zone includes at least one cell. At least one BS taking charge of the at least one cell assigns a unique TCID to each MS and an MS located in one transparent zone uses the unique TCID throughout the transparent zone.

Further, although each of the BS1 213 through the BS7 283 can take charge of multiple cells, it will be assumed, for ease of description only that, as illustrated in FIG. 2, each of the BS1 213 through the BS7 283 takes charge of only one cell.

Meanwhile, the cells that are under respective control of the BS1 213 through the BS7 283 are classified or grouped into at least one transparent zone. One transparent zone includes at least one cell. Further, the transparent zone includes at least one BS that takes charge of a cell included in the transparent zone. In an exemplary implementation as illustrated in FIG. 2, there are two transparent zones including a transparent zone A 200 and a transparent zone B 260. In more detail, transparent zone A 200 includes cell #1 211 through cell #5 251 wherein each of cells #1 through #5 includes its respective BS (i.e. BS1 213 through BS5 253). Similarly, transparent zone B 260 includes cell #6 271 and cell #7 281 wherein both of cells #6 and #7 includes its respective BS (i.e. BS6 273 through BS7 283).

According to an exemplary embodiment of the present invention, the MS uses the unique TCID assigned to it by the BS taking charge of the cell. Notably, the TCID is used in common by the BSs included in the same transparent zone. That is, once an MS is assigned a TCID by a BS in the transparent zone, the MS has no need to be assigned a new TCID when making a handover between BSs existing in the same transparent zone.

For example, the BSs of BS1 213 through BS5 253 included in the transparent zone A 200 share an MS-unique CID, or TCID, for identification of each MS in the transparent zone A 200.

However, if the MS that was receiving a service in the transparent zone A 200 moves to the transparent zone B 260, it should be assigned a new TCID from a BS located in the transparent zone B 260.

The communication system may also include a transparent management device that manages transparent zones and TCIDs used in the transparent zones. The transparent management device can provide BSs of the communication system with transparent zone information and TCID information used in the transparent zones. According to an exemplary embodiment of the present invention, the transparent management device can be included in a Base Station Controller (BSC) or a BS in the communication system, and can also be realized in the form of an independent transparent management device.

Figure 3:
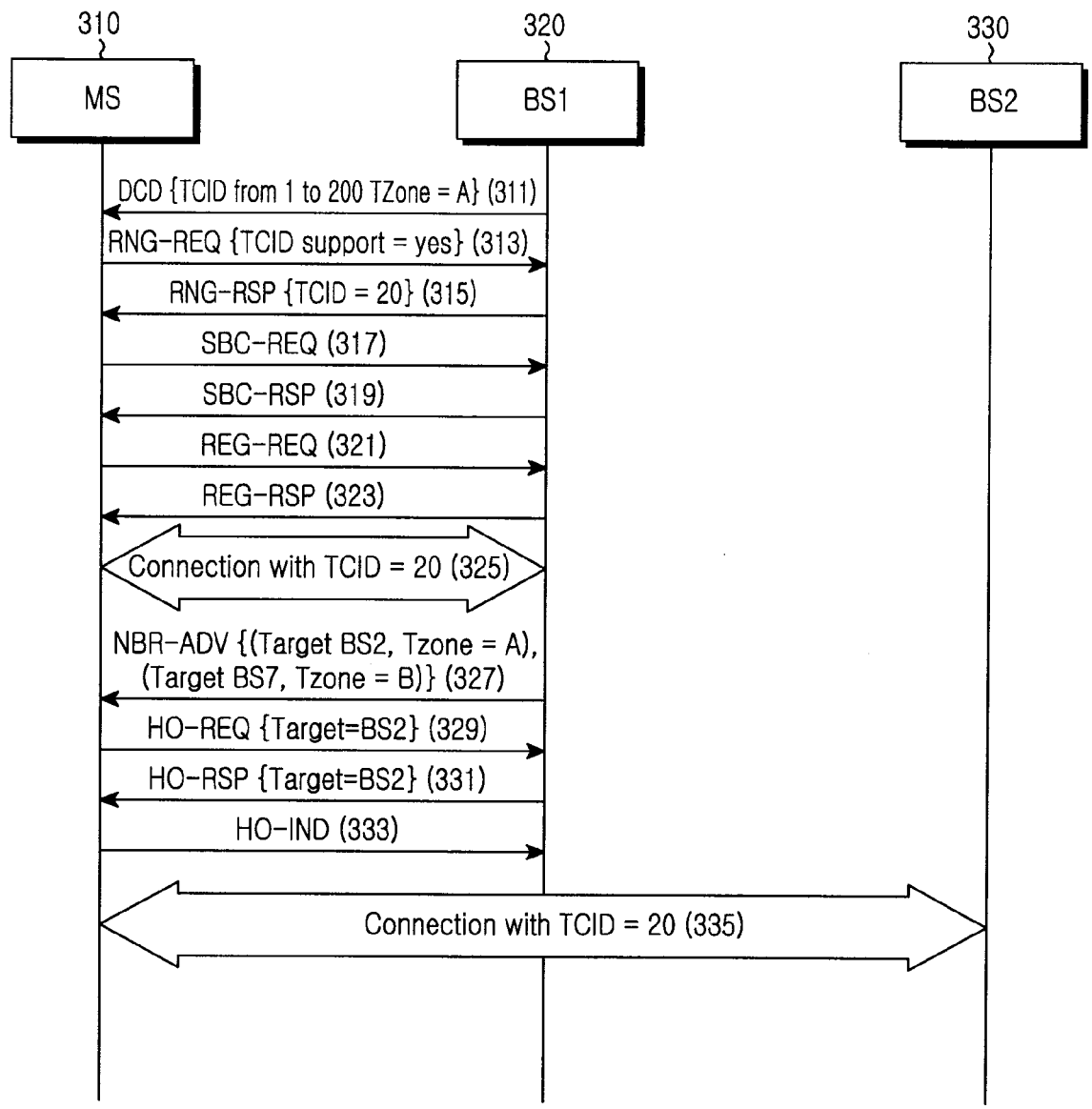
FIG. 3 is a signaling diagram illustrating an operation of transmitting and receiving CIDs in a communication system according to an exemplary embodiment of the present invention.

With reference to FIG. 3, a description will now be made of an operation of transmitting and receiving CIDs in a communication system according to an exemplary embodiment of the present invention.

Referring to FIG. 3, the communication system includes an MS 310, a first BS (BS1) 320 and a second BS (BS2) 330. In the example illustrated in FIG. 3, it is assumed that the BS1 320 is a serving BS which is now providing a communication service to the MS 310, and the BS2 330 is a target BS to which the MS 310 will handover.

The BS1 320 sends a Downlink Channel Descriptor (DCD) message to the MS 310 in step 311. In an exemplary implementation, the DCD message is broadcast by the BS1 320.

The DCD message includes range information of the TCID used by the BS1 320. The TCID range information is defined in Table 1.

TABLE 1

| Name | Type (1 byte) | Length (1 byte) | Value (4 bytes) | Scope |
|---|---|---|---|---|
| Transparent CID range | NNN | 4 | 2 bytes: start of Transparent CID interval<br>2 bytes: end of Transparent CID interval | DCD |

The TCID range information is inserted into the DCD message in the form of, for example, Type-Length-Value (TLV). Regarding the TLV, its Length has a 1-byte size and indicates that a size of Value is 4 bytes, and its Value has a 4-byte size and indicates a start value and an end point of a TCID interval used as a TCID in the corresponding BS.

Further, the DCD message includes zone information indicating the transparent zone in which the BS1 320 is located. That is, the DCD message includes transparent zone ID information. The transparent zone ID information is shown in Table 2.

TABLE 2

| Name | Type (1 byte) | Length (1 byte) | Value (1 byte) | Scope |
|---|---|---|---|---|
| Transparent zone ID | NNN | 1 | Zone ID | DCD<br>NBR-ADV |

The transparent zone ID information is inserted in the form of, for example, Type-Length-Value (TLV). Regarding the TLV, its Length has a 1-byte size and indicates that a size of Value is 1 byte, and its Value has a 1-byte size and indicates an ID of the transparent zone in which the corresponding BS is located.

The BS1 320 can transmit the transparent zone ID in the DCD message or in a Neighbor Advertisement (NBR-ADV) message.

Although the illustrated exemplary embodiment transmits the TCID information and the transparent zone ID along with the DCD message used in the general communication system in the TLV format, it is also possible to transmit them using a new message unused in a conventional communication system. In addition, although the illustrated exemplary embodiment transmits the TCID information using the TLV format, it is also possible to transmit the TCID information using formats other than the TLV format.

In an exemplary implementation, the DCD message includes TCID range information used in the BS1 320, i.e., a TCID interval's start value '1' and a TCID interval's end value '200'.

The MS 310, which has received the DCD message, perceives that the TCID used by the BS1 320 is between '1' and '200'. By receiving the TCID range information, the MS 310 perceives that the BS1 320 is a BS in which TCID is available.

In addition, the DCD message includes transparent zone ID information 'A'. Therefore, the MS 310 perceives that the BS1 320 is located in a transparent zone 'A'. The MS 310, when performing handover, can determine if a transparent zone of the target BS to which it will handover changes to a transparent zone different from the transparent zone of the BS1 320.

Upon receipt of the DCD message, the MS 310 sends a Ranging-Request (RNG-REQ) message to the BS1 320 in step 313. The RNG-REQ message includes basic information for call connection.

More specifically, the MS 310 determines if it can establish a connection to the BS1 320 using the TCID range information. If use of the TCID is possible, the MS 310 establishes a connection to the BS1 320 using the TCID. This scenario is called a first CID scheme. However, if use of the TCID is not possible, the MS 310 sets up a connection to the BS1 320 using a Basic CID. This scenario is called a second CID scheme.

The RNG-REQ message includes TCID support information indicating whether the MS 310 can support the TCID. The TCID support information is shown in Table 3.

TABLE 3

| Name | Type (1 byte) | Length (1 byte) | Value (1 byte) | Scope |
|---|---|---|---|---|
| Transparent CID support | NNN | 1 | 0: No support (default) 1: Support | RNG-REQ |

The BS1 320 sends a Ranging Response (RNG-RSP) message to the MS 310 in response to the RNG-REQ message in step 315. The RNG-RSP message includes a TCID assigned to the MS 310. The TCID assigned to the MS 310 is a TCID that the BS1 320 has assigned taking the TCID range information into account, and the TCID has a value within the TCID range information.

The RNG-RSP message includes the assigned TCID. In the example of FIG. 3, the TCID assigned to the MS 310 is, for example, '20'.

The MS 310 sends a Subscriber Station Basic Capability Request (SBC-REQ) message to the BS1 320 for basic capability negotiation for the MS 310 in step 317. The SBC-REQ message includes information on, for example, a modulation scheme and/or a coding scheme that the MS 310 can use.

Upon receipt of the SBC-REQ message from the MS 310, the BS1 320 sends a Subscriber Station Basic Capability Response (SBC-RSP) message to the MS 310 in response to the SBC-REQ message in step 319.

The MS 310 sends a Registration Request (REG-REQ) message to the BS1 320 in step 321. Upon receipt of the REG-REQ message, the BS1 320 registers the MS 310 using registration information of the MS 310, included in the REG-REQ message.

The BS1 320 sends a Registration Response (REG-RSP) message to the MS 310 in response to the REG-REQ message in step 323. Herein, the REG-RSP message includes registration information of the registered MS 310, and a Primary Management CID.

Being assigned the TCID and Primary Management CID, the MS 310 sets up a connection to the BS1 320 using the TCID and Primary Management CID in step 325. The MS 310 can be additionally assigned a Transport CID(s), and can exchange user data with the BS1 320.

The BS1 320 sends an NBR-ADV message to the MS 310 in step 327. The NBR-ADV message includes information on one or more BSs neighboring the BS1 320, and zone information, e.g., transparent zone ID information, which indicates a transparent zone in which the neighboring one or more BSs are located. For example, it is assumed in FIG. 3 that the NBR-ADV message includes information on the BS2 330, transparent zone information (transparent zone 'A') of the BS2 330, information on a BS7 (not shown), and transparent zone information (transparent zone 'B') of the BS7.

Upon detecting a need to handover, the MS 310 sends a Handover Request (HO-REQ) message to the BS1 320 in step 329. If it is possible to determine a target BS to which the MS 310 will handover, the HO-REQ message includes information on the target BS, e.g., BS2 330.

Upon receipt of the HO-REQ message, the BS1 320 sends a Handover Response (HO-RSP) message to the MS 310 in response to the HO-REQ message in step 331. The HO-RSP message includes information on the target BS (e.g., BS2 330) to which the MS 310 will handover.

Upon receipt of the HO-RSP message, the MS 310 determines whether to handover to the BS2 330 using the information included in the HO-RSP message. The MS 310, if it determines to handover to the BS2 330, sends to the BS1 320 a Handover Indication (HO-IND) message indicating that it will soon handover to the BS2 330 in step 333.

After sending the HO-IND message to the BS1 320, the MS 310 sets up a connection to the handover target BS, for example BS2 330, using the TCID that it previously received from the BS1 320 in step 335. The MS 310 determines ID information of the transparent zone in which the target BS is located, using information on a neighbor BS and ID information of the transparent zone where the neighbor BS is included, both of which are received through the NBR-ADV message. The MS 310 compares the transparent zone ID information of the BS1 320, received through the DCD message, with the transparent zone ID information of the target BS. Based on the comparison result, the MS 310 determines whether to continuously use the TCID assigned thereto.

Therefore, the MS 310 does not perform a separate ranging procedure when performing a handover to the BS2 330 existing in the same transparent zone. Thereafter, the MS 310 performs connection setup using the TCID previously assigned from the BS1 320.

If the target BS to which the MS 310 will handover is a BS7, the MS 310 does not perform step 335. That is, the MS 310 sends an RNG-REQ message to the BS7, and receives the TCID used in the transparent zone B from the BS7 through an RNG-RSP message in response to the RNG-REQ message. The BS7 is included herein in the transparent zone B. Therefore, since the MS 310 has moved from the transparent zone A including the old BS1 320 to the transparent zone B including the BS7, it is assigned a new TCID. The TCID is information uniquely assigned to each MS in one transparent zone. Therefore, in the transparent zone, each BS identifies the MS using the unique TCID assigned to the MS. As a result, it is possible to identify the MS using the TCID, thus avoiding assigning a separate Basic CID.

When it is impossible for the MS 310 to use the first CID scheme, the MS 310 sends in step 313 to the BS1 320 an RNG-REQ message indicating that it cannot support the TCID. Thereafter, the MS 310 is assigned a Basic CID, and sets up a connection to the BS1 320 using the Basic CID. The succeeding procedure is substantially the same as the conventional connection setup procedure between the MS and the BS, which is performed using the Basic CID.

In exemplary embodiments of the present invention, when an MS performs a handover within one transparent zone, the MS can directly establish a connection to the target BS using the previously received (assigned) TCID, without performing a separate ranging procedure. Therefore, in exemplary embodiments of the present invention, the BS can identify the MS using the TCID instead of the existing Basic CID.

Although the illustrated example sets the TCID corresponding to the Basic CID, this is merely by way of example. Accordingly, the Primary Management CID, like the Basic CID, can also be shared between BSs in the transparent zone.

As is apparent from the foregoing description, according to exemplary embodiments of the present invention, the MS can easily perform fast handover between the BSs sharing the TCID, using the previously assigned TCID. In addition, with the use of the TCID, exemplary embodiments of the present invention can enable connection setup without time delay between the BSs sharing the TCID.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting Connection Identifier (CID) information by a Base Station (BS) in a communication system, the method comprising:
   transmitting a first message including information indicating a Transparent Connection Identifier (TCID) range expressed by a start value and an end value of TCIDs available in the BS, and information indicating a first transparent zone in which the BS is located;
   assigning one of TCIDs in the TCID range to a Mobile Station (MS) when a second message including a connection setup request from the MS is received; and
   transmitting a third message including the assigned TCID to the MS,
   wherein the first transparent zone is one of a plurality of transparent zones supportable by the communication system, at least one BS is located in each transparent zone, and TCIDs in the TCID range are shared by the at least one BS located in the first transparent zone.

2. The method of claim 1, wherein the second message includes information indicating that the MS can use the TCID.

3. The method of claim 1, further comprising:
   transmitting a fourth message including information indicating a transparent zone to which each of at least one neighbor BS neighboring the BS belongs.

4. The method of claim 1, wherein the first message includes information indicating a transparent zone to which each of at least one neighbor BS neighboring the BS belongs.

5. A method for receiving Connection Identifier (CID) information by a Mobile Station (MS) in a communication system, the method comprising:
   receiving from a Base Station (BS) a first message including information indicating a first Transparent Connection Identifier (TCID) range expressed by a start value and an end value of TCIDs available in the BS, and information indicating a first transparent zone in which the BS is located;
   transmitting a second message including a connection setup request to the BS; and
   after transmitting the second message to the BS, receiving a third message including one of TCIDs in the first TCID range, which is assigned to the MS from the BS,
   wherein the first transparent zone is one of a plurality of transparent zones supportable by the communication system, at least one BS is located in each transparent zone, and TCIDs in the first TCID range are shared by the at least one BS located in the first transparent zone.

6. The method of claim 5, wherein the second message includes information indicating that the MS can use the TCID.

7. The method of claim 5, further comprising:
   receiving from the BS a fourth message including information indicating a transparent zone to which each of at least one neighbor BS neighboring the BS belongs.

8. The method of claim 5, wherein the first message includes information indicating a transparent zone to which each of at least one neighbor BS neighboring the BS belongs.

9. The method of claim 8, further comprising:
   setting up a connection to the BS using a TCID included in the third message;
   determining if a transparent zone to which a first neighbor BS belongs is equal to the first transparent zone in which the BS is located when a need is detected to handover to the first neighbor BS among the at least one neighbor BS after setting up the connection; and
   setting up a connection to the first neighbor BS using the assigned TCID included in the third message when the transparent zone to which the first neighbor BS belongs is equal to the first transparent zone to which the BS belongs.

10. The method of claim 9, further comprising:
    transmitting the second message to the first neighbor BS when the transparent zone to which the first neighbor BS belongs is not equal to the first transparent zone to which the BS is located; and
    after transmitting the second message to the first neighbor BS, receiving a fifth message including one of TCIDs in a second TCID range, which is assigned to the MS from the first neighbor BS,
    wherein the second TCID range comprises a range expressed by a start value and an end value of TCIDs available in the first neighbor BS.

11. A Base Station (BS) for transmitting Connection Identifier (CID) information in a communication system, the BS comprising:
    a transmitter for transmitting a first message including information indicating a Transparent Connection Identifier (TCID) range expressed by a start value and an end value of TCIDs available by the BS itself, and information indicating a first transparent zone in which the BS is located; and
    an assignor for assigning one of TCIDs in the TCID range to a Mobile Station (MS) when a second message including a connection setup request from the MS is received,
    wherein the transmitter transmits a third message including the assigned TCID to the MS, the first transparent zone is one of a plurality of transparent zones supportable by the communication system, at least one BS is located in each transparent zone, and TCIDs in the TCID range are shared by the at least one BS located in the first transparent zone.

12. The BS of claim 11, wherein the second message includes information indicating that the MS can use the TCID.

13. The BS of claim 11, wherein the transmitter transmits a fourth message including information indicating a transparent zone to which each of at least one neighbor BSs neighboring the BS belongs.

14. The BS of claim 11, wherein the first message includes information indicating a transparent zone to which each of at least one neighbor BS neighboring the BS belongs.

15. A Mobile Station (MS) for receiving Connection Identifier (CID) information in a communication system, the MS comprising:
   a receiver for receiving from a Base Station (BS) a first message including information indicating a first Transparent Connection Identifier (TCID) range expressed by a start value and an end value of TCIDs available in the BS, and information indicating a first transparent zone in which the BS is located; and
   a transmitter for transmitting a second message including a connection setup request to the BS,
   wherein, after the transmitting of the second message to the BS, the receiver receives a third message including one of TCIDs in the first TCID range, which is assigned from the BS, the first transparent zone is one of a plurality of transparent zones supportable by the communication system, at least one BS is located in each transparent zone, and TCIDs in the first TCID range are shared by the at least one BS located in the first transparent zone.

16. The MS of claim 15, wherein the second message includes information indicating that the MS can use the TCID.

17. The MS of claim 15, wherein the receiver receives from the BS a fourth message including information indicating a transparent zone to which each of at least one neighbor BS neighboring the BS belongs.

18. The MS of claim 15, wherein the first message includes information indicating a transparent zone to which each of at least one neighbor BS neighboring the BS belongs.

19. The MS of claim 18, wherein the MS sets up a connection to the BS using a TCID included in the third message, determines if a transparent zone to which a first neighbor BS belongs is equal to the first transparent zone in which the BS is located when a need is detected to handover to the first neighbor BS among the at least one neighbor BS after setting up the connection, and sets up a connection to the first neighbor BS using the assigned TCID included in the third message when the transparent zone to which the first neighbor BS belongs is equal to the first transparent zone to which the BS belongs.

20. The MS of claim 19, wherein the transmitter transmits the second message to the first neighbor BS when the transparent zone to which the first neighbor BS belongs is not equal to the first transparent zone to which the BS belongs, and, after the transmitting of the second message to the first neighbor BS, the receiver receives a fifth message including one of TCIDs in a second TCID range, which is assigned from the first neighbor BS,
   wherein the second TCID range comprises a range expressed by a start value and an end value of TCIDs available in the first neighbor BS.

* * * * *